United States Patent [19]

Davison et al.

[11] 4,041,103

[45] Aug. 9, 1977

[54] BLENDS OF CERTAIN HYDROGENATED BLOCK COPOLYMERS

[75] Inventors: Sol Davison; William P. Gergen, both of Houston, Tex.

[73] Assignee: Shell Oil Company, Houston, Tex.

[21] Appl. No.: 693,462

[22] Filed: June 7, 1976

[51] Int. Cl.² .............................................. C08L 77/00
[52] U.S. Cl. ............................ 260/857 D; 260/857 L; 260/857 UN
[58] Field of Search ..................................... 260/857 D

[56] References Cited

U.S. PATENT DOCUMENTS

| | | | |
|---|---|---|---|
| 3,546,319 | 12/1970 | Prevorsek | 260/857 D |
| 3,595,942 | 7/1971 | Wald | 260/880 B |

FOREIGN PATENT DOCUMENTS

| | | |
|---|---|---|
| 703,498 | 3/1968 | Belgium |
| 46-38611 | 11/1971 | Japan |

*Primary Examiner*—Paul Lieberman
*Attorney, Agent, or Firm*—Dean F. Vance

[57] ABSTRACT

Polymeric blends, covering the range from rubber-like to flexible mechanical behavior, having outstanding resistance to shrinkage and distortion on heat aging, resistance to ozone, good tensile properties, resilience, processability, as well as a combination of toughness and flexibility are comprised of certain selectively hydrogenated block copolymers and polyamide polymers.

8 Claims, No Drawings

4,041,103

BLENDS OF CERTAIN HYDROGENATED BLOCK COPOLYMERS

BACKGROUND OF THE INVENTION

Block copolymers have been developed rapidly within the recent past, the starting monomers usually being monoalkenyl arenes such as styrene or alpha-methylstyrene and conjugated dienes such as butadiene and isoprene. A typical block copolymer of this type is represented by the structure polystyrene-polybutadiene-polystyrene (SBS). When the monoalkenyl arene blocks comprise less than about 55% by weight of the block copolymer, the product is essentially elastomeric. Moreover, due to the peculiar set of physical properties of such a block copolymer it can be referred to more properly as a thermoplastic elastomer. By this is meant a polymer which in the melt state is processable in ordinary thermoplastic processing equipment but in the solid state behaves like a chemically vulcanized rubber without chemical vulcanization having been effected. Polymers of this type are highly useful in that the vulcanization step is eliminated and, contrary to vulcanized scrap rubbers, the scrap from the processing of thermoplastic elastomers can be recycled for further use.

Those block polymers which comprise in part conjugated diene polymer blocks have one substantial shortcoming, namely, their susceptibility to oxidation or ozonolysis. Substantial improvement both in stability and compatibility with alpha-olefin polymers have been made by hydrogenation of such block polymers. The hydrogenation may be non-selective, selective or complete. Certain technical advantages have been found for selective hydrogenation wherein at least about 80% of the aliphatic double bonds are reduced and no more than about 25% of the aromatic double bonds are reduced by hydrogenation. Block copolymers having selectively hydrogenated conjugated diene blocks are disclosed in U.S. Pat. No. 3,595,942. These selectively hydrogenated block copolymers are repesented by the structure poly(monoalkenyl arene)/hydrogenated polydiene/poly(monoalkenyl arene). A typical block copolymer of this type is polystyrne/poly(ethylene/-butylene)/polystyrene obtained by selectively hydrogenating polystyrene/polybutadiene/polystyrene (SBS) where the polybutadiene has a relatively high 1,2-cis configuration (35-55 mol percent).

While these selectively hydrogenated block copolymers have vastly improved stability over their unsaturated precursors, they have certain shortcomings which it would be desirable to eliminate or minimize. Chief among these is poor processability. It is possible, of course, to improve processability by diluting the polymer with extending oils and the like. This normally results in a drastic reduction in other physical properties, particularly, heat resistance, tensile strength and properties associated therewith. Blends of these block copolymers with a second resin for processability improvement are known, but in most instances the second resin is a relatively nonpolar polymer. Highly polar polymers typically are not compatible with these block copolymers. Blends of polystyrene/polybutadiene/polystyrene block copolymers (SBS) with nylon polymers have been disclosed in U.S. Pat. No. 3,546,319 (15% SBS rubber in polyamide), Belgium Pat. No. 70,498 (35% nylon in SBS), and Japan Pat. No. 7,138,611 (5 to 50% SBS in polyamide). The SBS differs from the selectively hydrogenated SEBS in that the solubility parameter, in units of $(cal/cm^3)_{1/2}$ as calculated by Small's method (J. Applied Chemistry, Vol 3, page 71, 1953) of the polybutadiene specific block is 8.4 rather that of the poly(ethylene/butylene) block is only 7.9. Because of the significant difference in these block solubility parameters, SBS and SEBS have profoundly different melt viscosity — shear stress behavior. Furthermore, the solubility parameters of highly polar polymers is much greater than that of either the B or EB blocks (for example the solubility parameter of nylon 66 is 13.6). Therefore, the blending characteristics of non-hydrogenated and hydrogenated block polymers are highly different, and, particularly when blended with highly polar polymers, such as polyamides, are unpredictable.

SUMMARY OF THE INVENTION

In the pesent invention, compositions, covering the range from rubber-like to flexible mechanical behavior, are disclosed comprising an interpenetrating network composed of 100 parts by weight of a block copolymer having at least two polymer blocks A and at least one polymer block B, each polymer block A being selected from the group consisting of monoalkenyl arene polymers and hydrogenated derivatives thereof wherein no more than about 25% of the arene double bonds have been reduced, and polymer block B is a polymer of a $C_{4-5}$ conjugated diene wherein at least about 80% of the aliphatic unsaturation has been reduced by hydrogenation subsequent to polymerization; and 5-200 parts per 100 parts by weight of rubber of a polyamide having 4 to 12 carbon atoms inclusive between the amide linkages which form the polymer backbone. It has been found that blends of these two types of polymers exhibit improved processability as compared to the block copolymer by itself, while retaining flexibility and resiliency. Molded parts exhibit excellent dimensional stability at elevated temperatures of approximately 300° F as compared to parts formed from unblended block copolymer or other block copolymer blends.

DESCRIPTION OF THE PREFERRED EMBODIMENTS

A. Block Copolymer

The block copolymers with which this invention is concerned may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer midblock B as defined above. Methods for the preparation of such polymers are known in the art. Particular reference will be made to the use of lithium-based catalysts and especially lithium-alkyls for the preparation of the precursor polymers (polymers before hydrogenation). The U.S. Pat. No. 3,595,942 referred to hereinabove not only describes the polymers but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with multifunctional coupling agents such as dihalo-alkanes or -alkenes as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)
polystyrene-polyisoprene-polystyrene (SIS)
poly(alpha-methylstyrene)-polybutadiene-poly(alpha-methylstyrene) ($\alpha$-MeSB$\alpha$-MeS) and
poly (alpha-methylstyrene-polyisoprene-poly(alpha-methylstyrene) ($\alpha$-MeSI$\alpha$-MeS)

It will be understood that both blocks A and B may be either homopolymer or random copolymer blocks as long as each block predominates in at least one class of the monomers characterizing the blocks as defined hereinbefore. Thus, blocks A may comprise styrene/alpha-methylstyrene copolymer blocks or styrene/-butadiene random copolymer blocks as long as the blocks individually predominate in monoalkenyl arenes. The term "monoalkenyl arene" will be taken to include styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene, copolymers of butadiene with isoprene and copolymers of one of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of alternating ethylene and propylene (EP).

Hydrogenation of the precursor block copolymers is preferably effected by use of catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of aliphatic double bonds are hydrogenated and less than 5% of the aromatic double bonds are hydrogenated.

The average molecular weights of the individual blocks may vary within certain limits. In most instances, the monoalkenyl arene blocks will have number average molecular weights in the order of 2,000-50,000 while the conjugated diene blocks either before or after hydrogenation will have average molecular weights in the order of 20,000-300,000. These molecular weights are most accurately determined by tritium counting methods or osmotic pressure measurements. The proportion of the monoalkenyl arene blocks should be between about 8 and 55% by weight of the block copolymer, preferably between about 10 and 30% by weight.

While the average molecular weight of the individual blocks is not critical at least within the above specified limits it is important to select the type and the total molecular weight of the block copolymer in order to ensure the compatibility necessary to get the interpenetrating network under the chosen blending conditions. Best results are obtained when the viscosities of the block copolymer and the nylon are substantially the same at the conditions of temperature and shear used for blending and processing. Block polymer molecular weight (Mn, number average molecular weight) of about 25,000 to about 200,000 are suitable, about 35,000 to about 150,000 preferred and about 45,000 to about 70,000 particularly preferred. In some instances, matching of the viscosities of the block polymer portion and the polyamide portion is best achieved by using two or more block copolymers or nylons. For example, a blend of two block polymers with different molecular weights or blend of a hydrogenated SBS (SEBS) and hydrogenated SIS (SEPS) could be used to make up the block polymer portion.

Matching of the viscosities of the block copolymer portion and polyamide portion may also be accomplished by adding supplemental components such as hydrocarbon oils and resins. These supplementary components may be blended with the polyamide portion, the block copolymer portion, or both portions, but it is preferred to add the additional components to the block copolymer portion.

Types of oils useful in the practice of this invention are those polymer extending oils ordinarily used in the processing of rubber and plastic. Especially preferred are the types of oil that are compatible with the elastomeric segment of the block copolymer. While oils of higher aromatics content are satisfactory, those petroleum based white oils having low volatility and less than about 50% aromatics content as determined by the clay gel method (tentative ASTM method D2007) are particularly preferred. The oils should additionally have low volatility, preferably having an initial boiling point above 500° F. The amount of oil employed varies from about 0 to about 50 phr (parts by weight per hundred parts by weight rubber), preferably about 5 to about 30 phr. The additional resins employed in matching viscosities are polymeric alpha-olefins and flow promoting resins such as alpha-methylstyrene resins, vinyl toluene/alpha-methylstyrene resins, and endblock plasticizing resins. The polymer alpha-olefins include both high and low density polyethylene, isotactic and atactic polypropylene, and polybutene-1. The preferred poly alpha-olefin is isotactic polypropylene, which is a crystalline polypropylene. The amount of additional resin employed varies from about 0 to about 100 phr, preferably about 5 to about 25 phr.

B. Polyamides

The polyamides of the invention herein referred to as nylons are represented by the following formulas:

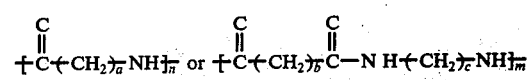

where $a$, or $b$ and $c$ individually vary from 4 to 12 inclusive. While the nylons can be those having pendant hydrocarbon groups in place of a hydrogen attached to the nitrogen or the methylene carbons of the polymer backbone, this normally lowers the melting point of the nylon and is not consistent with one of the purposes of the present invention. The molecular weights (Mn - number average molecular weight) of the polyamides used in the invention are generally above about 10,000, preferably between about 10,000 and about 30,000, more peferably between about 15,000 and about 25,000.

Preferred nylons are nylon 6 (polymer of epsilon amino caprolactam), nylon 6,6 (polymer of hexamethylene diamine and adipic acid), nylon 6,10 (polymer of hexamethylene diamine and sebacic acid), nylon 11 (polymer of $\omega$-amino undecanoic acid), nylon 4 (polymer of pyrrolidone), nylon 7 (polymer of amino heptanoic acid), nylon 9 (polymer of 9-amino nonanoic acid). Nylon 6 and nylon 6,6 are particularly preferred. The amount of polyamide employed varies from about 5 to about 200 phr, preferably about 5 to about 75 phr, more preferably about 10 to about 40 phr.

C. Method of Forming Interpenetrating Network

High melting point resins are normally incompatible with the block copolymers as described herein; that is, typical blends produce grossly heterogeneous mixtures with no useful properties. Therefore, an essential aspect of the present invention is that the polyamide and block copolymer must be blended in such a way as to form interpenetrating networks; i.e., where one polymer would be thought of as filling the voids of a form of the second polymer. The interpenetrating form of the blend is not one in which there is molecular mixing. Also, although the polymers form separate and distinct phases, they are not in a form which can lead to gross phase separation causing delamination.

Without wishing to be bound to any particular theory, it is considered that there are two general requirements for the formation of an interpenetrating network. First, there must be a primary network formed or in the process of forming in the shearing field. This requirement if fulfilled by employing the block copolymers of the instant invention having sufficiently high molecular weight to retain domain structure in processing. Second, the other polymer employed must be capable of some kind of chemical or kinetic reaction to form an infinite network from a disassociated melt. The polymer must possess sufficient fluidity to penetrate the interstices of the primary network. This second requirement is fulfilled by employing the instant polyamides.

There are at least two means (more positive than the observance of the absence of delamination) by which the presence of an interpenetrating network can be shown. In one method, an interpenetrating network is shown when molded or extruded objects made from the blends of this invention are placed in a solvent that dissolves away the block copolymer, and the remaining polymer structure (comprising the polyamide) still has the shape of the molded or extruded object. If the remaining structure has the appearance of continuity then an interpenetrating network has been formed.

The second method of detecting the presence of an interpenetrating network is by measuring the tensile strength at break of the blend. This follows simply from the fact that an applied tensile stress is distributed over the available network elements. The number of elements supporting a force is decreased in the presence of a noncontributing filler. At low concentrations of the secondary heterophase (the polyamide) where an interpenetrating network is absent, islands of polyamide crystallites dilute the number of block copolymer elements bearing stress. If the concentration of polyamide is increased to a point where a continuous crystalline structure occurs throughout the block copolymer network, the second network is then capable of bearing a portion of the tensile strength and the presence of interpenetrating network is shown by increased tensile modulus and strength.

The blending of the nylon and the hydrogenated block copolymer may be done in any manner that avoids producing a blend which will delaminate on processing, i.e., in any manner that produces the interpenetrating network. For example, the two polymers may be dissolved in a solvent common for both and coagulated by admixing in a solvent in which neither polymer is soluble. But more preferably, a particularly useful procedure is to intimately mix the two polymers as melts of nibs and/or powder in a device which provides shear. In the case of nylon 11, milling on a two inch mill at 195°–214° C for 10–15 minutes was sufficient to achieve a compatible blend, but was not sufficient for blending nylon 6 or nylon 66. However, good results were obtained with nylon 6 using a Banbury Laboratory Model B mixer. In order to achieve the mixing necessary for an interpenetrating network with nylon 66 it was necessary to use both the mixing obtained with a Banbury Laboratory Model B and a pass through a Ankerwerk 3-ounce reciprocating screw injector molder. One commercially practical way to ensure the proper structure for the composition i.e., the interpenetrating network, is to blend the polymers as nibs and/or powders on a Banbury at a temperature of about 10°–30° C above the melting point of the highest melting polymer, followed by a processing step, i.e., extruding on a twin screw extruder, or injection molding on a reciprocating screw machine.

The mixing or processing temperature employed typically varies from about 200° C to about 300° C.

The blend of nylon with selectively hydrogenated block copolymer may be compounded further with other polymers, oils, fillers, antioxidants, stabilizers, antiblocking agents and other rubber and plastic compounding ingredients without departing from the scope of this invention. These additives are often present in commercial products for various purposes, especially to reduce costs. The vulcanizing or crosslinking agents found in commercial rubbers are not normally required for the products of this invention because, as stated above, the block copolymers are self-crosslinking.

Elastomeric compositions prepared in accordance with this invention are suitable for most purposes where rubbers and flexible thermoplastics such as polyurethanes are employed, such as in mechanical goods, thermoformed articles, insulations, etc. The compositions may be injection molded, blow molded, or extruded. Other molded articles as well as films, sheets, textile coatings and the like may be produced. The compositions may be cast from solvents to form films or spun into fibers or coated on other objects. Molding compositions having the usual plastic end uses may be prepared, particularly when the monoalkenyl arene polymer blocks constitute a high percentage of the weight of the block polymer. Contemplated plastic end uses encompass moldings, mechanical goods, extruded objects such as films, sheets, fibers and the like. The present invention is especially useful in applications where fabricated articles are subjected to high temperature oxidative environments such as automotive under-the-hood applications or electrical power cable applications.

To illustrate the instant invention, the following illustrative embodiments are given. It is to be understood, however, that the embodiments are for the purpose of illustration and the invention is not to be regarded as limited to any of the specific materials or conditions used in the specific embodiments.

Illustrative Embodiment I

The following two tables set out blends of polystyrene/hydrogenated polybutadiene/polystyrene block copolymer with low and medium viscosity nylon 6 and low viscosity nylon 66. These blends are prepared by mixing the components on a Banbury Model "B" Laboratory mixer at approximately 400° C for about 7 minutes, until a smooth blend was obtained, followed by injection molding in a reciprocating screw Ankerwerk injection molding machine at 500° F.

Block copolymer A has block molecular weights of about 25,000–100,000–25,000; copolymer B followed block molecular weights of about 9,000–47,000–9,000; and copolymer C has block molecular weights of about 6,000–35,000–6,000.

The formulations and results are presented below in Tables 1, 2 and 3.

Table 1

COMPOSITION OF TEST SAMPLES

| Sample No. | Block Copolymer A | B | C | Polyamide Nylon 6 low vis. | Nylon 6 med. vis. | Nylon 6,6 low vis. | Poly-propylene med. mf | high mf | Acrylic[1] Resin | Poly-vinyl[2] Toluene Resin | Ethylene[3] Vinyl-acetate Co-polymer | Plasti-[4] cizer Oil | Stabil-[5] izer AO, UV | Pig-ment[6] Carbon Black |
|---|---|---|---|---|---|---|---|---|---|---|---|---|---|---|
| 1131 | 50 | — | 60 | — | — | — | — | 10 | — | — | — | 20** | 2 | 5 |
| 1132 | — | 50 | 50 | — | — | — | — | 10 | — | — | — | — | 2 | 5 |
| 1136 | — | 50 | 50 | 30 | — | — | — | 10 | — | — | — | — | 2 | 5 |
| 1149 | 50 | 50 | — | 45 | — | — | 15 | — | — | — | — | 20 | 2 | 5 |
| 1150 | 50 | 50 | — | 30 | — | — | 15 | — | 30 | — | — | 20 | 2 | 5 |
| 1151 | 50 | 50 | — | 60 | — | — | 15 | — | — | — | — | 20 | 2 | 5 |
| 1152 | — | 100 | — | 45 | — | — | 15 | — | — | — | — | — | 2 | 5 |
| 1153 | — | 100 | — | 30 | — | — | 10 | — | — | — | — | — | 2 | 5 |
| 1154 | 25 | 75 | — | 45 | — | — | 15 | — | — | — | — | 10 | 2 | 5 |
| 1155 | — | 100 | — | 30 | — | — | 15 | — | 15* | — | — | — | 2 | 5 |
| 1156 | — | — | 100 | 30 | — | — | 10 | — | — | — | — | — | 2 | — |
| 1157 | — | — | 100 | 30 | — | — | — | 10 | — | — | — | — | 2 | — |
| 1158 | — | — | 100 | 30 | — | — | — | — | — | 10 | — | — | 2 | — |
| 1163 | — | 50 | 50 | — | — | 30 | — | 10 | — | — | — | — | 2 | 5 |
| 1165 | — | 100 | — | 30 | — | — | — | — | — | 10 | — | — | 2 | — |
| 1166 | — | 100 | — | 30 | — | — | — | — | — | 10 | 10 | — | 2 | — |
| 1168 | — | 50 | 50 | — | 30 | — | 10 | — | — | — | — | — | 2 | — |
| 1169 | — | 100 | — | — | 30 | — | 10 | — | — | — | — | — | 2 | — |

[1])Acryloid KM-611 and *Acryloid K-120N resins, Rohm and Haas.
[2])Piccotex 120 resin PICCO.
[3])Ultrathene 641 resin, USI Chemical.
[4])Indopol H-50 oil, Amoco Chemical and **SHELLFLEX® 790 oil, Shell Chemical.
[5])0.5 phr each hindered phenol and dilaurylthiodipropionate antioxidants, benzotriazole and hydroxybenzoate UV stabilizers.
[6])1:1 dispersion of SRF black in high mf ethylene-vinylacetate copolymer.

Table 2

PHYSICAL PROPERTIES[1] OF TEST SAMPLES[2]

| Sample Number | Hardness Shore D | Gardener Impact, in lbs. 20 (−30° C) | 20–50 (23° C) | 90 (23° C) | Stiffness,[3] psi/rad. | Ross Flex % Cut Growth 0.5 Kc | 10 Kc | Oven Stability[4] Shrinkage | Distortion |
|---|---|---|---|---|---|---|---|---|---|
| 1131 | 18 | V. good | good | 100% cut | — | — | — | V. high | severe |
| 1132 | 26 | V. good | — | — | — | — | — | V. high | severe |
| 1136 | 38 | Cracked | good | sl. cut deforms | 5700/7800 | — | — | None | None |
| 1149 | 35 | Cracked | fair-good | sl. cut deforms | — | — | — | — | — |
| 1150 | 32 | Cracked | fair-good | sl. cut deforms | — | — | — | — | — |
| 1151 | 40 | Cracked | fair-good | sl. cut deforms | — | 600 | 900 | — | — |
| 1152 | 43 | Cracked | fair-good | sl. cut deforms | — | — | — | — | — |
| 1153 | 37 | Cracked | fair-good | sl. cut deforms | — | 200 | 900 | — | — |
| 1154 | 39 | Cracked | fair-good | sl. cut deforms | — | — | — | — | — |
| 1155 | 42 | Cracked | fair-good | sl. cut deforms | — | — | — | — | — |
| 1156 | 41 | Cracked | fair-good | deforms | — | — | — | None | None |
| 1157 | 38 | Cracked | fair-good | deforms | — | — | — | None | None |
| 1158 | 38 | V. good | fair | deforms | — | — | — | None | None |
| 1163 | 40 | — | fair-good | — | — | 0 | 400 | None | None |
| 1165 | 40 | — | fair-good | — | — | 200 | 900 | None | None |
| 1166 | 43 | — | fair-good | — | — | — | — | None | None |
| 1168 | — | — | fair-good | — | — | 0 | 700 | — | — |
| 1169 | — | — | fair-good | — | — | — | — | — | — |

Table 2-continued
PHYSICAL PROPERTIES[1] OF TEST SAMPLES[2]
good

| Sample Number | Angle[5] Tear, pli | Flexural Modulus of Elasticity, psi (70° C) | (23° C) | (−30° C) | Tensile Properties[6] $M_{100, psi}$ | $T_{b, psi}$ | $E_{b, \%}$ |
|---|---|---|---|---|---|---|---|
| 1131 | 295/285 | — | — | — | — | — | — |
| 1132 | 330/300 | — | — | — | — | — | — |
| 1136 | 330/350 | 5,000 | 18,200 | — | 1,100 | 2,450 | 500 |
| 1149 | — | — | 9,300 | — | 1,000 | 1,000 | 250 |
| 1150 | — | — | 6,800 | — | — | — | — |
| 1151 | 280/260 | — | 18,000 | — | 1,100 | 1,150 | 110 |
| 1152 | — | — | 17,000 | — | 1,300 | 1,900 | 380 |
| 1153 | 400/350 | — | 15,000 | — | — | — | — |
| 1154 | — | — | 12,600 | — | — | — | — |
| 1155 | — | — | 25,800 | — | 1,200 | 1,200 | 500 |
| 1156 | — | — | 18,600 | — | — | — | — |
| 1157 | — | 5,000 | 24,100 | — | — | — | — |
| 1158 | — | 3,700 | — | — | — | — | — |
| 1163 | 500/400 | — | 15,300 | — | 1,600 | 2,700 | 460 |
| 1165 | 400/300 | — | 20,100 | — | 1,000 | 2,300 | 470 |
| 1166 | — | — | — | — | 1,000 | 2,700 | 550 |
| 1168 | — | — | — | — | — | — | — |
| 1169 | — | — | — | — | — | — | — |

[1] All properties measured on injection molded samples at 23° C unless otherwise specified.
[2] Compositions are given in Table 1.
[3] Tinius - Olson stiffness measured normal and parallel to flow respectively.
[4] 1 hour at 300° F.
[5] Die C angle tear measured normal and parallel to flow respectively.
[6] Microdumbbells are measured parallel to flow.

Table 3
COMPOSITION AND PHYSICAL PROPERTIES OF TEST SAMPLES

| Sample Number | Block Copolymer[2] | Nylon 6[2] | Nylon 6,6[2] | Stabilizer[3] | Hardness Shore D | Properties at 23° C Stiffness,[4] psi/rad. × 10⁻³ (N) | (P) | Gardner Impact 50 in.-lb. |
|---|---|---|---|---|---|---|---|---|
| 1228 | 100 | — | 50 | 1.7 | 41 | 8 | 8.5 | Excellent |
| 1229 | 100 | — | 100 | 1.7 | 60 | 16 | 21 | Very Good |
| 1230 | 100 | — | 150 | 1.7 | 65 | 24 | 27 | Poor |
| 1231 | 100 | — | 200 | 1.7 | 68 | 30 | 37 | Poor |
| 1232 | 100 | 100 | — | 1.7 | 52 | 11 | 13 | Excellent |
| 1233 | — | 100 | — | — | 77 | — | — | Poor |

[1] Hydrogenated S-B-S, nominal weight 65 M, approximately 28% styrene.
[2] Medium viscosity type 6 resin, low viscosity type 6,6.
[3] 0.2 phr hindered phenol antioxidant, 0.5 phr each dilaurylthiodipropionate antioxidant, benzotriazole and hydroxybenzoate UV stabilizers.
[4] Tinius - Olson stiffness measured normal (N) and parallel (P) to direction of flow during injection molding.

Illustrative Embodiment II

A 250 lb sample of a nylon 6, polystyrene/hydrogenated polybutadiene/polystyrene block copolymer blend having the following composition and properties was made by blending on a Werner-Pfleiderer twin screw extruder, model ZSK 83/700, at zone temperatures ranging from 200°–240° C then injection molding test parts on a Stokes reciprocating screw injection molding machine at 230–275° C.

Composition

| Ingredients | phr |
|---|---|
| Block Copolymer[1] | 50 |
| Block Copolymer[2] | 50 |
| Nylon 6 Resin[3] | 30 |
| Polypropylene[4] | 10 |
| Carbon Black Concentrate[5] | 5 |
| Antioxidants[6] | 1 |
| UV Stabilizers[7] | 1 |

[1] Nominal molecular weight 65m, approximately 28% w polystyrene.
[2] Nominal molecular weight 47m, approximately 28% w polystyrene.
[3] Low viscosity nylon 6 resin.
[4] Medium melt flow polypropylene nibs.
[5] 1/1 dispersion of SRF black in EVA.
[6] Equal amounts of a hindered phenol and dilaurylthiodipropionate.
[7] Equal amounts of a benzotriazole and an hydroxybenzoate.

| Property | Physical Properties[1] ASTM Method | Result |
|---|---|---|
| Specific Gravity | — | 0.96 |
| Tensile and Hardness Properties | | |
| Hardness, Shore A Points | — | 91 |
| Hardness, Shore D Points | — | 36 |
| Tensile Strength at Break, psi 23° C | D-412 | 2,200 |
| Elongation at Break, % 23° C | D-412 | 350 |
| Modulus at 100% Elongation, psi 23° C | D-412 | 1,300 |
| Modulus at 300% Elongation, psi 23° C | D-412 | 2,000 |
| Flexural Properties | | |
| Modulus of Elasticity, psi 23° C | D-790 | 18,000 |
| 70° C | | 5,000 |
| −30° C | | 45,000 |
| Tinius-Olson Stiffness, psi/rad | D-747 | 6,000–8,000 |
| Tear Strength | | |
| Die Angle Tear, pli | D-624 | 320–550 |
| Abrasion Resistance | | |
| Tabor H-18, cc/1000 rev. | D-1044 | 1.90 |
| Impact Resistance | | |
| Gardner 20 in/lb | — | good |
| 50 in/lb | | good |
| 80 in/lb | | fair-good |
| (−30° C) 20 in/lb | | fair-good |
| Elastic Nature | | |
| Tensile Hysteresis, 100% Elongation First cycle loss, % | — | 70 |

| Property | Physical Properties[1] ASTM Method | Result |
|---|---|---|
| Equilibrium loss, % | | 40 |

[1] Properties were measured on ASTM plaques or Ross Flex bars which were injection molded on a Stokes reciprocating screw machine at 45-525° F.

Illustrative Embodiment III 100 parts of a hydrogenated SBS resin having polystyrene blocks with a number average molecular weight of 10,000 and a hydrogenated butadiene block with a number average molecular weight of 50,000 with 0.2 phr IONOL were blended with 50 parts of a nylon 11, (Rilson BMNO from Aquitaine Chemical) on a 2 Farrell mill for 10-15 minutes at 195°-215° C. The blend processed well on the mill, and compression molded tensile bars did not show delamination. A satisfactory interpenetrating blend is obtained. The physical properties were:

| Tensile at break | 1060 psi |
|---|---|
| Elongation at break | 400% |
| Modulus at 300% elong. | 780 psi |
| Set at break | 15% |

Illustrative Embodiment IV

Illustrative Embodiment II is repeated but a poly(alpha-methylstyrene)/hydrogenated butadiene/poly(alpha-methylstyrnene) block copolymer is used in place of the SEBS. A satisfactory interpenetrating blend is obtained.

Illustrative Embodiment V

Illustrative Embodiment II is repeated except a polystyrene/hydrogenated polyisoprene/polystyrene block copolymer is substituted for the SEBS. A satisfactory interpenetrating blend is obtained.

Illustrative Embodiment VI

Illustrative Embodiment II is repeated except a poly(alphamethylstyrene)/hydrogenated polyisoprene/poly(alpha-methylstyrene) block copolymer is substituted for the SEBS. A satisfactory interpenetrating blend is obtained.

The illustrative embodiments show that the impact strength, elasticity and flexibility are greatly reduced at nylon contents substantially over 50%, based on total blend, and that nylon/hydrogenated ABA blends are vastly superior in resistance to heat distortion at high temperatures in comparison to the neat selectivity hydrogenated ABA-type block copolymers.

What is claimed is:

1. A composition comprising the admixture obtained by intimately mixing 100 parts by weight of a block copolymer and about 5 to about 200 parts by weight of a polyamide so as to form an interpenetrating network wherein:

a. said block copolymer comprises at least two monoalkenyl arene polymer end blocks A and at least one substantially completely hydrogenated conjugated diene polymer midblock B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000; and b. said polyamide has the formula:

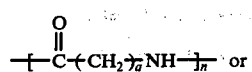 I

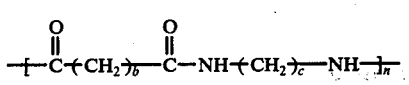 II where $a$ or $b$ or $c$ individually vary from 4 to 12 inclusive, and n is chosen so that the number average molecular weight is between about 10,000 and about 30,000.

2. A composition according to claim 1 wherein the polyamide is nylon 6,6.

3. A composition according to claim 1 wherein the polyamide is nylon 6.

4. A composition according to claim 1 wherein the monoalkenyl arene is styrene and the conjugated diene is butadiene having a 1,2 content of between about 35% and 55%.

5. A composition according to claim 1 wherein the amount of polyamide employed varies from about 10 to about 40 phr.

6. A composition according to claim 1 wherein the polyamide is selected from the group consisting of nylon 6; nylon 6,6, nylon 6,10; nylon 11; nylon 4; nylon 7; nylon 9; and mixtures thereof.

7. A composition according to claim 1 wherein the block copolymer and polyamide are intimately mixed at substantially the same viscosities.

8. A composition according to claim 1 wherein the amount of polyamide employed varies from about 5 to about 75 parts by weight.

* * * * *